(12) United States Patent
Peterson et al.

(10) Patent No.: US 6,385,303 B1
(45) Date of Patent: *May 7, 2002

(54) SYSTEM AND METHOD FOR IDENTIFYING AND ANNOUNCING A CALLER AND A CALLEE OF AN INCOMING TELEPHONE CALL

(75) Inventors: Joe Peterson; Bob Dildy; David Borland, all of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/969,780

(22) Filed: Nov. 13, 1997

(51) Int. Cl.$^7$ .............................. H04M 1/64; H04M 3/42
(52) U.S. Cl. .................. 379/67.1; 379/68; 379/72; 379/82; 379/207.15; 379/207.16
(58) Field of Search ..................... 379/67.1, 88.01, 379/88.16, 88.21, 88.23, 88.25, 142, 212, 214, 221, 270, 40, 41, 42, 37, 38, 156, 157, 419, 420, 201, 159, 177, 90.01, 93.35, 215, 377, 388, 68, 71, 72, 76, 82, 88.02, 88.03, 88.19, 88.2, 207.13, 207.14, 207.15, 207.16; 704/240, 248, 251

(56) References Cited

U.S. PATENT DOCUMENTS

| | | | |
|---|---|---|---|
| 4,172,967 A | * 10/1979 | Porter et al. .............. | 179/1 HF |
| 4,371,752 A | 2/1983 | Matthews et al. ....... | 379/88.26 |
| 4,481,382 A | 11/1984 | Villa-Real .................. | 455/556 |
| 4,720,848 A | * 1/1988 | Akiyama ..................... | 379/88 |
| 4,723,271 A | 2/1988 | Grundtisch ................. | 379/181 |
| 4,757,525 A | 7/1988 | Matthews et al. ....... | 379/88.26 |
| 4,776,006 A | * 10/1988 | Comerford et al. ......... | 379/159 |
| 4,783,797 A | 11/1988 | Hashimoto ................... | 379/79 |
| 4,807,225 A | * 2/1989 | Fitch ............................ | 370/71 |
| 4,894,861 A | * 1/1990 | Fujioka ....................... | 379/374 |
| 4,899,358 A | * 2/1990 | Blakely ....................... | 379/67 |
| 4,924,496 A | 5/1990 | Figa et al. .................. | 379/142 |

(List continued on next page.)

FOREIGN PATENT DOCUMENTS

| | | |
|---|---|---|
| EP | 0 622 934 | 11/1994 |
| EP | 0 637 158 A1 | 2/1995 |
| GB | 2 144 946 | 3/1985 |
| GB | 2 240 693 | 8/1991 |
| WO | 95/05045 | 2/1995 |
| WO | 97/28631 | 8/1997 |

OTHER PUBLICATIONS

"Talking Caller ID: The Caller ID that SPEAKS for itself," Home Automation Systems at http//www.smarthome.com, downloaded and printed Feb. 2, 1998, 1 sheet.

"View Caller ID on your TV: Caller ID Info shows up automatically on the top of your TV screen when the phone rings!" Home Automation Systems, Inc., at http://www.smarthome.com, downloaded and printed Feb. 2, 1998, 2 sheets.

(List continued on next page.)

Primary Examiner—Allan Hoosain
(74) Attorney, Agent, or Firm—Conley, Rose & Tayon, PC; Robert C. Kowert (57) ABSTRACT

The present invention comprises a telephone system and method that identify and announce the caller and/or the callee of an incoming telephone call. After receiving a telephone call from a caller, the telephone system answers the incoming telephone call. The identity of the caller is then determined. The telephone system prompts the caller to say his/her name. The name is recorded and repeatedly played back through a built-in speaker announcing the name of the caller to the users of the telephone. The telephone system may also ask the caller to say the name of the callee. In that case, the name of the callee is also recorded and repeatedly played back. The name of the caller and the name of the callee are both announced to the users of the telephone.

29 Claims, 6 Drawing Sheets

U.S. PATENT DOCUMENTS

| | | | |
|---|---|---|---|
| 4,985,913 A | | 1/1991 | Shalom et al. ................. 379/76 |
| 5,007,076 A | | 4/1991 | Blakley .................... 379/88.21 |
| 5,023,868 A | * | 6/1991 | Davidson et al. .............. 370/62 |
| 5,062,133 A | | 10/1991 | Melrose ........................ 379/94 |
| 5,086,458 A | | 2/1992 | Bowen ........................ 379/180 |
| 5,117,451 A | | 5/1992 | Ladd et al. .................... 379/67 |
| 5,127,049 A | | 6/1992 | Sabo ........................... 379/199 |
| 5,157,712 A | | 10/1992 | Wallen, Jr. .................... 379/74 |
| 5,163,083 A | | 11/1992 | Dowden et al. ......... 379/88.03 |
| 5,200,994 A | | 4/1993 | Sasano et al. ............... 379/142 |
| 5,220,599 A | * | 6/1993 | Sasano et al. ............... 379/142 |
| 5,265,145 A | * | 11/1993 | Lim ............................. 379/88 |
| 5,268,957 A | | 12/1993 | Albrecht ...................... 379/67 |
| 5,283,818 A | | 2/1994 | Klausner et al. ......... 379/88.25 |
| 5,327,486 A | * | 7/1994 | Wolff et al. ................... 379/96 |
| 5,349,638 A | | 9/1994 | Pitroda et al. .............. 379/142 |
| 5,384,831 A | | 1/1995 | Creswell et al. .............. 379/67 |
| 5,388,150 A | | 2/1995 | Schneyer et al. ........ 379/88.19 |
| 5,394,445 A | * | 2/1995 | Ball et al. ..................... 379/67 |
| 5,402,472 A | * | 3/1995 | MeLampy et al. ............ 379/67 |
| 5,425,089 A | | 6/1995 | Chan et al. .................. 379/183 |
| 5,440,615 A | | 8/1995 | Caccuro et al. ............... 379/67 |
| 5,452,346 A | | 9/1995 | Miyamoto ................... 379/142 |
| 5,471,522 A | | 11/1995 | Sells et al. ............... 379/93.11 |
| 5,481,594 A | | 1/1996 | Shen et al. ............... 379/88.19 |
| 5,483,579 A | | 1/1996 | Stogel ........................... 379/88 |
| 5,490,205 A | | 2/1996 | Kondo et al. .............. 379/67.1 |
| 5,497,414 A | | 3/1996 | Bartholomew .............. 379/67 |
| 5,515,422 A | * | 5/1996 | MeLampy et al. ......... 379/67.1 |
| 5,522,089 A | | 5/1996 | Kikinis et al. ................ 710/73 |
| 5,550,900 A | | 8/1996 | Ensor et al. ................... 379/67 |
| 5,559,860 A | | 9/1996 | Mizikovsky ................. 379/58 |
| 5,566,231 A | | 10/1996 | Sizer, II ..................... 379/142 |
| 5,596,631 A | | 1/1997 | Chen ........................... 379/177 |
| 5,604,790 A | | 2/1997 | Grimes ......................... 379/67 |
| 5,604,791 A | | 2/1997 | Lee ......................... 379/88.21 |
| 5,604,792 A | | 2/1997 | Solomon et al. ......... 379/88.23 |
| 5,623,537 A | | 4/1997 | Ensor et al. ............... 379/88.2 |
| 5,644,629 A | | 7/1997 | Chow ......................... 379/142 |
| 5,651,055 A | | 7/1997 | Argade ......................... 379/88 |
| 5,652,789 A | * | 7/1997 | Miner et al. ................. 379/201 |
| 5,661,788 A | | 8/1997 | Chin .......................... 379/142 |
| 5,809,111 A | * | 9/1998 | Matthews .................... 379/31 |
| 5,812,972 A | | 9/1998 | Juang et al. ................ 704/234 |
| 5,822,544 A | | 10/1998 | Chaco et al. ................... 705/2 |
| 5,838,772 A | * | 11/1998 | Wilson et al. ............. 379/67.1 |
| 5,850,435 A | * | 12/1998 | Devillier ..................... 379/374 |
| 5,883,942 A | * | 3/1999 | Lim et al. ................... 379/142 |
| 5,903,628 A | * | 5/1999 | Brennan .................. 379/88.21 |
| 5,946,386 A | | 8/1999 | Rogers et al. ............... 379/265 |
| 5,978,451 A | | 11/1999 | Swan et al. .............. 379/88.24 |
| 6,021,181 A | * | 2/2000 | Miner et al. ............. 379/88.23 |
| 6,058,171 A | | 5/2000 | Hoopes ...................... 379/142 |
| 6,122,347 A | * | 9/2000 | Borland ....................... 379/70 |
| 6,215,860 B1 | * | 4/2001 | Johanson et al. ........ 379/88.28 |

OTHER PUBLICATIONS

Berger, et al., "An Application Specific DSP For Speech Applications," IEEE Transactions on Consumer Electronics 39, Nov. 1993, No. 4, New York, XP 000423058, pp. 733–738.

Naganawa, et al., "A Study Of Audio Communication Devices For ISDN," IEEE Transactions on Consumer Electronics 36, Aug. 1990, No. 3, New York, XP0001626, pp. 753–757.

Philips, News Release, "Hearing is Believing With Magnavox Announce[TM] Caller ID," May 1, 1997, 2 pages.

Product Advertisement, Class Co., Inc., "Stop Running every time the Phone Rings Get a VoiceAnnounce Caller ID from ClassCo," May 1, 1997, 4 pages.

MITEL CMOS MT8843, "Calling Number Identification Circuit 2," Issue 3, Apr. 1996, pp. 5–1 through 5–22.

MITEL MSAN–164, "Application of the MT8843 Calling Number Identification Circuit 2," Issue 1, Oct. 1996, pp. 5–1 through 5–18.

* cited by examiner

SYSTEM AND METHOD FOR IDENTIFYING AND ANNOUNCING A CALLER AND A CALLEE OF AN INCOMING TELEPHONE CALL

FIELD OF THE INVENTION

The present invention relates to the field of telephone systems and more particularly to a telephone system and method for announcing a caller and a callee of an incoming telephone call.

DESCRIPTION OF THE RELATED ART

Telephone subscribers communicate via a vast telephone network, referred to as the Public Switched Telephone Network (PSTN). In the present disclosure, the term "PSTN" is intended to include the analog phone network or POTS (Plain Old Telephone Service), ISDN (Integrated Services Digital Network), DSL (Digital Subscriber Line), and Wireless Local Loop (WLL), among others.

A telephone subscriber's communications devices, e.g., telephones, are typically connected in parallel to a telephone line which links a subscriber's premises to a telephone service provider's central office. An ordinary telephone is the most familiar of such communications devices. An ordinary telephone includes a handset, and the handset includes a receiver and a transmitter. The receiver is designed to be placed over a user's ear during use, and the transmitter designed to be positioned in close proximity to the user's mouth during use.

In a POTS system, when the telephone is not in use, the telephone is disconnected from the telephone line, except for a ringer circuit. When a caller places a telephone call to a receiving party, switching equipment in the central office transmits a series of ring signals over the receiving party's telephone line. The ring signals cause the ringer circuit of the receiving party's telephone to generate sounds which alert the receiving party to the incoming telephone call. At the same time, the switching equipment sends a series of ring-back signals to the caller to let the caller know that the telephone call is being placed. When the receiving party answers the incoming telephone call, a communication is established between the caller and the receiving party.

Several different types of communications devices are designed to automatically transmit or receive information following detection of one or more ring signals. Examples of such communications devices include telephone answering machines and communications devices equipped with modulator-demodulators (modems). An answering machine typically includes control circuitry which electrically connects a voice message unit to the telephone line after a predetermined number of ring signals are detected, causes the voice message unit to transmit (i.e., play back) a pre-recorded outgoing voice message, and then receives and records any incoming voice message transmitted by the caller following transmission of the outgoing voice message. Digital communications devices equipped with modems exchange frequency-encoded information via the telephone network. Facsimile (fax) machines are examples of such digital communications devices. A fax machine typically includes control circuitry which electrically connects a modem to a telephone line after a predetermined number of ring signals are detected, then either transmits or receives frequency-encoded digital information. A modulator portion of a modem within a transmitting fax machine converts a digital value (i.e., a logic one or a logic zero) to a corresponding analog tone. A demodulator portion of a modem within a receiving fax machine performs the opposite function, converting the analog tone to the corresponding digital value.

Telephone service providers also offer "Caller ID" services which provide information about a caller. Devices which receive, store, and display digital Caller ID information are widely available. The Caller ID service is typically available to telephone subscribers for a small additional monthly fee. Under current standards, frequency-encoded digital Caller ID information is transmitted between the first and second ring signals. Information about a caller is thus received, stored, and displayed by a Caller ID device before a user would normally answer a ringing telephone. Caller ID information is typically recorded by Caller ID devices whether the associated telephone is answered or not. Caller ID circuitry may be included as part of a telephone or the caller ID circuitry may be part of a separate box that is also connected to the telephone line.

A telephone system would be desirable that provides the user or the users with additional features for a more effective use of their telephone service. Desirable features could be, for example: a feature that would enable the user to stop accepting incoming calls and inform the caller to that effect; a feature that could identify the caller and/or the callee of incoming call and alert the user to the identity of the caller and/or callee. Such features would enhance the usefulness of a user's telephone service.

Applicants are aware of the "party line" telephone networking. The "party line" comprises one telephone line that extends to multiple houses with support for multiple telephone numbers. Upon receiving a telephone call, all the telephones that are connected to the line ring but with a different cadence.

SUMMARY OF THE INVENTION

The present invention comprises an improved telephone system with additional features that enable a user or users to make more effective use of their telephone service.

In the first embodiment, the present invention comprises an improved telephone system and method that reduce call interruptions to a telephone, i.e., reduce interruptions caused by a caller placing a call to the telephone. The user can enable the no-call feature either by operating a switch on the telephone or by entering a specific numeric code using the telephone's keypad. If the no-call feature is enabled and a call is received by the telephone, when the telephone is answered, the telephone then plays a message to the caller indicating that no calls are being taken. The telephone plays the message after the call is answered. The telephone does not generate an audible ring signal in response to the telephone call received from the caller. Instead of generating a ring signal, the telephone plays the no-call message in response to the no-call feature being enabled.

The telephone system, according to the first embodiment, further comprises an exemption logic unit for allowing calls placed by certain callers to come through even when the no-call feature is enabled. The user indicates the exception parties to the no-call feature prior to receiving a call from an external party. If the caller is determined to be an exception party after a telephone call is received, a ring signal is generated, and the user may then answer the call in a normal fashion.

Several methods are used to determine whether the caller is an exception party. In one method, the voice of the caller is analyzed using voice recognition techniques to determine the identity of the caller. Alternatively, a caller is asked to enter a personal identification number. Upon entering the correct identification number, the call is allowed through. A third method of identifying the caller comprises using information obtained from a Caller ID unit.

In the second embodiment, the present invention comprises an improved telephone system and method that determine the identity of the callee of an incoming telephone call. A distinctive ring is first selected by one or more of the users of the telephone prior to activating the feature or at any later time. The callee identification feature is enabled either by operating a switch on the telephone or by entering a specific numeric code using the telephone's keypad. Information about the individual distinctive ring signals is stored in memory inside the telephone. When an incoming call is received from an external party, the telephone determines which one of the users is the callee of the telephone call. A distinctive ring signal is then generated corresponding to the callee of the incoming telephone call. The distinctive ring signal identifies the callee of the incoming telephone call to the telephone users.

In order to identify the callee of the telephone call, the telephone system, after answering the telephone call, inquires the caller for the identity of the callee. For example, the telephone announces the list of possible callees and ask the caller to enter a numeric code corresponding to the callee of the telephone call.

A callee may also be identified using voice recognition techniques. After answering a call, the telephone, using a prerecorded message, asks the caller to say the name of the callee. The telephone voice-processes the received voice signals in order to determine the identity of the callee. The telephone then generates a distinctive ring corresponding to the identified callee that identifies the callee to the telephone users.

In an embodiment where multiple telephones are connected on the same telephone line, one telephone is designated as the master telephone. Upon receiving an incoming telephone call, all the telephones that are connected to the line answer the incoming telephone call. In an embodiment where the callee is identified by inquiring the caller, the master telephone performs the inquiry and any other prompting of the caller that is involved. In an embodiment where the callee is identified by other means, for example, caller ID, all the telephones perform the identification. In all the embodiments, all the telephones on the line contain logic that generates the distinctive ring signals that identify the callee.

In the third embodiment, the present invention comprises an improved telephone system and method that determine the identity of the callee of an incoming telephone call by first determining the identity of the caller. The telephone users program the telephone by entering information on calling parties and their corresponding callees prior to any incoming telephone calls and prior to activating the feature. The users may also reprogram the telephone at any later time. The information on callers and corresponding callees is stored in memory inside the telephone. In addition, each user selects a distinctive ring signal that is unique to the user. Information about the distinctive ring signal is also stored in memory. The telephone system uses caller ID information, voice recognition, or prompts the caller for a numeric code in order to determine the identity of the caller.

The identity of the callee is determined after determining the identity of the caller. Information entered by the users during setup is accessed in order to determine which callee corresponds to the identified caller. Once the identity of the callee is established, a distinctive ring signal corresponding to the identified callee is generated.

In an embodiment where multiple telephones are connected on the same telephone line, one telephone is designated as the master telephone. Upon receiving an incoming telephone call, all the telephones that are connected to the line answer the incoming telephone call. In an embodiment where the caller is identified by inquiring the caller, the master telephone performs the inquiry and any other prompting of the caller that is involved. In an embodiment where the caller is identified by other means, for example, caller ID, all the telephones perform the identification. In all the embodiments, all the telephones on the line contain logic that generates the distinctive ring signals that identify the callee.

In the fourth embodiment, the present invention comprises a telephone system and method that identify and announce the caller and/or the callee of an incoming telephone call. After receiving a telephone call from a caller, the telephone system answers the telephone call. The identity of the caller is then determined. The telephone system prompts the caller to say his/her name. The name is recorded and repeatedly played back through a built-in speaker announcing the name of the caller to the users of the telephone.

In addition, the telephone system may also ask the caller to say the name of the callee. In that case, the name of the callee is also recorded and repeatedly played back. The name of the caller and the name of the callee are both announced to the users of the telephone.

In an embodiment where multiple telephones are connected on the same telephone line, one telephone is designated as the master telephone. Upon receiving an incoming telephone call, all the telephones that are connected to the line answer the incoming telephone call. In an embodiment where the caller and/or the callee are identified by inquiring the caller, the master telephone performs the inquiry and any other prompting of the caller that is involved. In an embodiment where the caller is identified by other means, for example, caller ID, all the telephones perform the identification. In all the embodiments, all the telephones on the line contain logic that enable the telephones to announce the identity of the caller and/or the callee.

In the fifth embodiment, the present invention comprises a telephone system and method for self-announcing a caller of an incoming telephone call. After an incoming call is received from a caller, the telephone answers the telephone before any ring signals are generated. A message is then generated requesting the caller to self-announce him/herself. A speaker on the telephone is activated to enable the telephone users to listen to the announcement.

After the caller self-announces him/herself, a user, if present, may decide to answer the telephone call. The user may answer the telephone call either by placing the telephone in speakerphone mode or by activating the handset and engaging in a conversation with the caller. If the user is not present or chooses not answer the telephone call, the telephone transfers control to an answering machine unit so that the caller is given the choice of leaving a message. In one embodiment, the answering machine is built-in to the telephone. In another embodiment, the answering machine is an external unit attached to the telephone.

In an embodiment where multiple telephones are connected on the same telephone line, one telephone is designated as the master telephone. Upon receiving an incoming telephone call, all the telephones that are connected to the line answer the incoming telephone call. Only the master performs any prompting of the caller that is involved. The caller's self identification is then heard on all the telephones that are connected on the line.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

First Embodiment, System and Method for Reducing Call Interruptions Caused by Incoming Telephone Calls.

Figure 1:
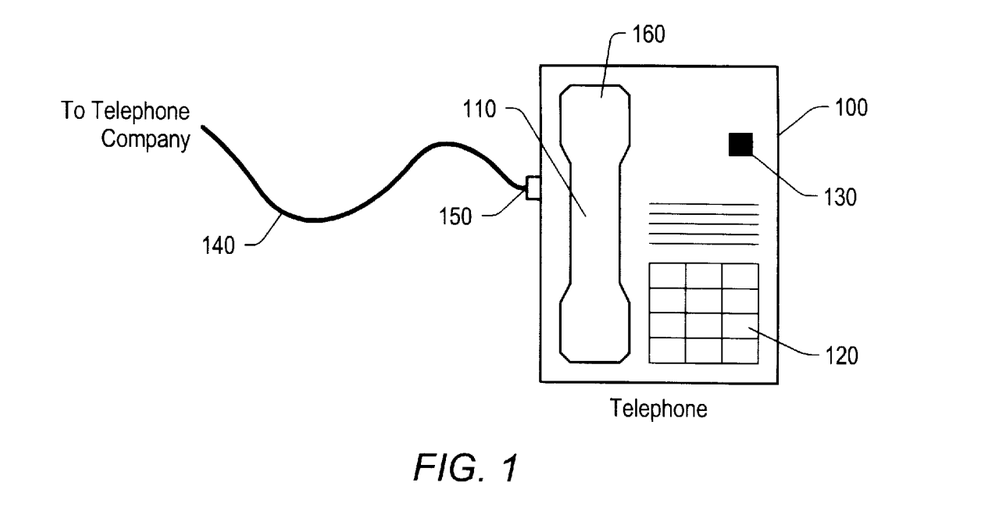
FIG. 1 shows a telephone with improved features and a switch for enabling/disabling the improved features.

In the first embodiment, the present invention comprises an improved telephone system that reduces call interruptions to a telephone, wherein the call interruptions are produced by a caller placing a call to a telephone. Such a telephone system is shown in FIG. 1. Telephone 100 is connected to the telephone service provider's central office using telephone line 140. Telephone 100 is coupled to telephone line 140 through port 150 for sending and receiving telephone signals to and from the central office. As used in the present invention, "telephone" may refer to a conventional or telephone, a digital telephone, cordless telephone, or a cellular telephone. Furthermore, the telephone functions may be performed by a computer, a personal digital assistant (PDA), a web surfer, or any other system that has a sub-function that acts like a classic telephone.

Telephone 100 further comprises handset 110. Handset 110 comprises a speaker for receiving voice signals and generating an audible sound and a microphone for transmitting voice over the telephone line. In a POTS network, when the handset is located in the cradle of the telephone, the placement and/or weight of the handset 110 maintains hook switch 160 in the open position. Once the handset 100 is picked up by the user, hook switch 160 closes and telephone 100 turns on for placing or answering a call. It is noted that hook switch 160 may be closed by other means, such as the user pressing a "talk" button in the case of a cordless phone. Furthermore, for an ISDN, DSL, WLL, or other networks, the telephone answers the telephone call using means appropriate to that network.

Figure 2:
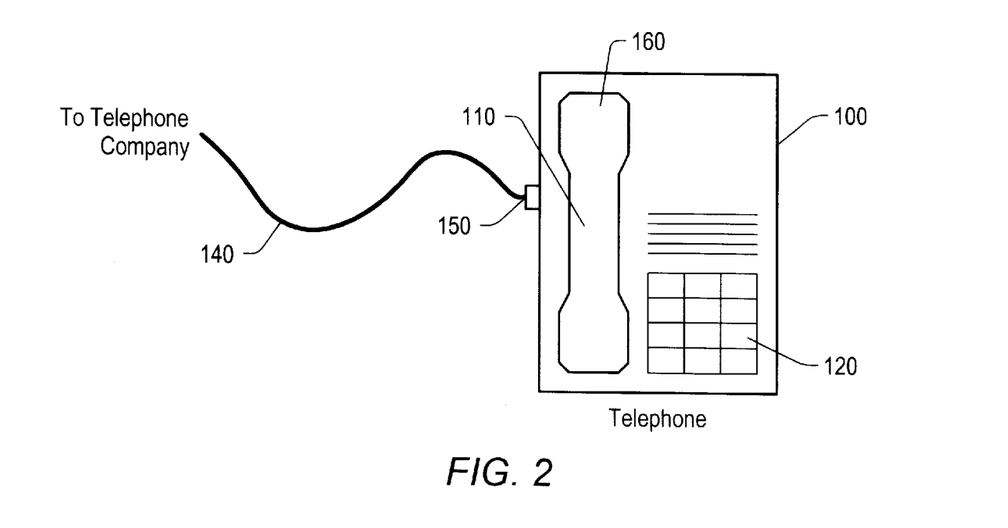
FIG. 2 shows a telephone with improved features.

Telephone 100 includes a no-call switch 130. No-call switch 130 is preferably a toggle switch for turning the no-call feature on and off. The no-call feature will be discussed further below. Alternatively, the no-call feature is activated and deactivated by lifting handset 110 and entering a numeric code using the keypad 120. For example, *28 may be the activation code and *29 may be the deactivation code. Such a telephone, without no-call switch 130, is shown in FIG. 2. In another embodiment, the no-call feature is enabled/disabled using a computer system coupled to the phone, wherein the no-call switch is either directly coupled to the telephone or coupled through the telephone line.

Figure 3:
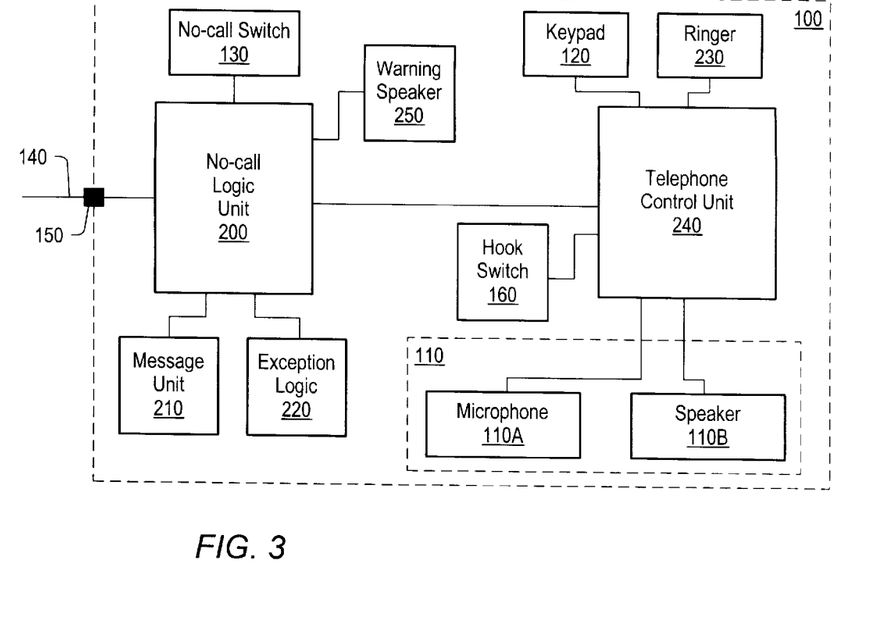
FIG. 3 shows a block diagram of a telephone with a no-call feature.

FIG. 3 shows a block diagram of telephone system 100. When a caller places a call, a ring signal is transmitted to telephone system 100 through telephone line 140 to port 150. No-call logic unit 200, which is directly coupled to port 150, first receives the incoming ring signal. If the no-call feature is disabled by either toggling no-call switch 130 or by entering the appropriate activation/deactivation code through keypad 120, no-call logic unit 200 transmits the ring signal to telephone control unit 240.

Telephone control unit 240 performs regular telephone functions as are well known in the art. Upon receiving a ring signal, telephone control unit 240 sends the ring signal to ringer 230. Ringer 230 produces an audible ring that alerts the user to the incoming call. The user then answers the telephone call. In a POTS, the user answers the telephone call by lifting handset 110, which closes switch 160 and places the telephone off-hook. For an ISDN, DSL, WLL, or other types of telephone network, the telephone is answered by other means appropriate to the protocol used. The user then transmits voice to the caller by talking into microphone 110A and receives sound by listening to speaker The user can enable/disable the no-call feature either by operating switch 130 on the telephone or by entering a numeric code using the telephone's keypad. If the location, i.e., the home, includes a plurality of telephones, then preferably one of the telephones is the master telephone. Upon receiving an incoming telephone call, the master telephone answers the call before any other phone in the household. If the no-call feature is enabled, the master telephone plays the outgoing message and terminates the telephone call. If the no-call feature is not enabled or if the caller is an exception party, the master telephone allows the telephone signal to be transmitted to all the telephones in the household.

If the no-call feature is enabled and a call is received by the telephone, no-call logic unit 200 answers the telephone call but does not transmit the ring signal to telephone control unit 240. Consequently, ringer 230 does not ring to alert the user about the incoming call.

In one embodiment, telephone system 100 comprises warning speaker 250. In this embodiment, no-call logic unit 200 sends a signal to warning speaker 250 when the no-call feature is enabled and when an incoming call is received. Warning speaker 250 generates a sound that alerts the user to the incoming call and to the fact that the no-call feature is enabled. The sound generated by warning speaker 250 is distinctively different from the sound generated by ringer 230. The sound generated by warning speaker 250 is short in duration and not very loud and thus is less annoying than a ring signal.

When the no-call feature is enabled, no-call logic unit answers the incoming telephone call and then sends a signal to message unit 210 to begin playing an outgoing message. The outgoing message is transmitted over telephone line 140 to the caller. The outgoing message could either be a prerecorded message that is stored in message unit 210 or the outgoing message could be a message recorded by the user using headset 110 during setup or at a later time prior to the incoming telephone call. The outgoing message could, for example, be: "We are not accepting calls at this time. Please call back later."

Telephone system 100, according to the first embodiment, further comprises exception logic unit 220. Exception logic unit 220 contains information that allows certain parties, referred to as exception parties, to override the no-call feature. Information about the exception parties is stored in exception logic unit 220 by the user during setup prior to enabling the no-call feature. The list of exception parties may also be updated at any later time by the user. If the no-call feature is enabled, before playing back an outgoing message from message unit 210, exception logic unit 220 examines whether the caller is an exception party based on determining the identity of the caller. If the caller is determined to be an exception party, control is transferred to telephone control unit 240, a ring signal is generated by ringer 230, and the user answers the call in a regular fashion.

In another embodiment, the list may comprise non-exception parties. In this embodiment, the telephone rings normally for parties that are not included in the list. For parties that are included in the list, the no-call feature does not allow their calls through.

Information about the exception parties is stored in exception logic 220 in the form of a database. The database of exception parties is entered by the user during setup or at a later time prior to enabling the no-call feature. Numeric codes corresponding to each letter in the alphabet may be used by the user to enter the names of exception parties.

Several methods may be used to determine whether the caller is an exception party. In one embodiment, exception logic 220 contains circuitry that can perform Caller ID functions. The identity of the caller is then determined using Caller ID information. If the name of the caller matches a name that is stored in the database, the caller is considered an exception party.

Alternatively, voice recognition techniques are used by exception logic 220 to determine the identity of the caller. The exception logic, for example, asks the caller whether the user is an exception party. If the user answers "yes", exception logic performs voice recognition on the answer to determine the identity of the caller. The received voice is compared to previously stored voices from the exception parties.

Figure 4:
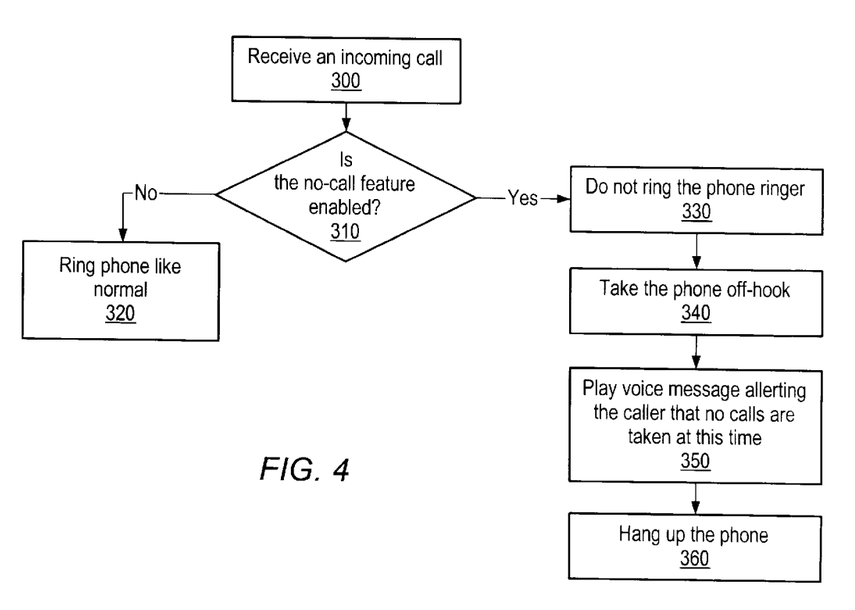
FIG. 4 shows a flowchart describing a method for reducing call interruptions by a caller placing a telephone call to a telephone.

The flowchart of FIG. 4 describes a method for reducing call interruptions on a telephone, wherein the call interruptions are caused by a caller placing a call to a telephone. In step 300, an incoming call is received by the telephone. The telephone system, in step 310, determines whether the no-call call feature is enabled. If the no-call feature is disabled, the telephone system, in step 320, operates in normal mode by ringing the ringer and waiting for the user to answer the incoming call.

If the no-call feature is enabled, the telephone system does not ring to alert the user to the incoming call as shown in step 330. The telephone system outputs an alternative, shorter in duration sound alerting the user to the incoming call and to the fact that the no-call is enabled. In step 340, the telephone answers the incoming telephone call. In step 350, a voice message is played alerting the caller that no calls are taken at this time. The voice message can be either a pre-recorded message or a message recorded by the user prior to enabling the no-call feature or at a later time. After the voice message is played, in step 360, the telephone hangs up.

In addition, in one embodiment, the telephone system allows certain exception parties to place a call to the telephone system even when the no-call feature is enabled. A test to determine the caller's identification is performed after answering the incoming telephone call and before a voice message is played to the caller. If the caller is determined to be an exception party, the telephone resumes normal operation, i.e., the ringer sounds and the telephone is ready to be answered by the user.

Second Embodiment, System for Identifying Callees of Incoming Telephone Calls

In the second embodiment, the present invention comprises an improved telephone system that identifies the callee of an incoming telephone call. Such a telephone system is shown in FIG. 1. In this embodiment, switch 130 is used for enabling and disabling the callee identification feature. Alternatively, the callee identification feature is activated by lifting handset 110 and entering a numeric code through keypad 120. Such a telephone, without switch 130, is shown in FIG. 2. As described above, the feature may also be activated by a computer connected to the telephone. As used in the present invention, "telephone" may refer to a conventional or telephone, a digital telephone, cordless telephone, or a cellular telephone. Furthermore, the telephone functions may be performed by a computer, a PDA, a web surfer, or any other system that has a sub-function that acts like a classic telephone.

Figure 5:
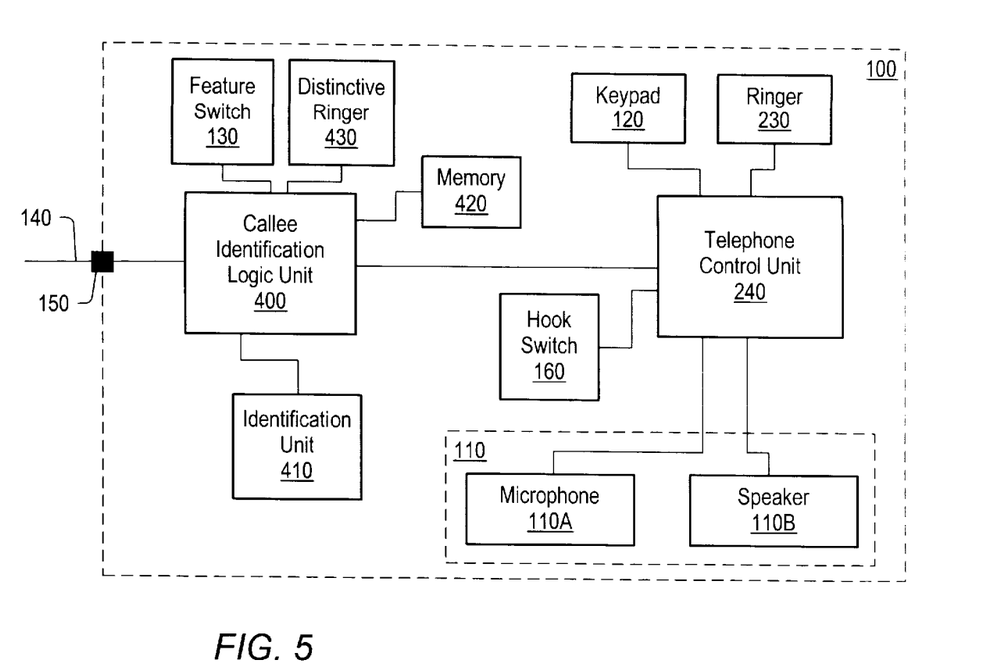
FIG. 5 shows a block diagram of a telephone that identifies the callee of an incoming telephone call.

FIG. 5 shows a block diagram of telephone system 100 with the callee identification feature. When a caller places a call to telephone system 100, a ring signal is transmitted to telephone system 100 through telephone line 140. Callee identification logic unit 400, which is directly coupled to port 150, first receives the incoming ring signal. Callee identification logic unit 400 identifies the callee of the incoming call and generates a distinctive ring that identifies the callee of the incoming call. A more detailed description of the callee identification will follow. After identifying the callee and generating the distinctive ring signal, callee identification logic unit 400 transfers control to telephone control unit 240. The callee identified by the distinctive ring signal may now answer the phone in a normal fashion.

Prior to receiving a telephone call, one or more of the users of the telephone system each program telephone system 100 with the user's name (or code) and a selected distinctive ring corresponding to each one of the users. The users may also reprogram the telephone system at any later time in order to add or subtract users' names and associated distinctive ring signals. In the preferred embodiment, the user enters a numeric code (for example, *37) using keypad 120 which places callee identification logic unit 400 in program mode. The user can also place the callee identifier logic unit 400 in program mode using a voice command, or other means. Alternatively, one of the users programs the telephone for all the users. By following voice instructions, the user voices his/her name into microphone 110A. The name is then digitized by callee identification logic unit 400 and stored in memory 420 in the form of a database. Alternatively, the user enters his/her name into the telephone by entering special codes through keypad 120. A combination of two numbers on the keypad may correspond to one letter of the alphabet, for example. The user then cycles through a voice menu in order to select a distinctive ring signal that will be generated for telephone calls intended for him/her. A code for the selected ring signal is added to the database in memory 420. The following table contains an example of what the database may contain.

| # | Recorded Name | Ring Signal Code |
|---|---|---|
| 1 | Dave | 13 |
| 2 | Joe | 9 |
| 2 | Adam | 4 |
| 4 | Kim | 11 |
| . | . | . |
| . | . | . |
| . | . | . |

In another embodiment, either directly or through the telephone line, the telephone system is coupled to a computer system, and software existing in the computer system is used to program the telephone system with the names of the users and the associated ring signals.

In a case where multiple telephones are connected on the same line, the database may be transmitted to all the telephones through an ethernet setup connecting together all of the telephones. In an embodiment where the database is not transmitted to the other telephones, the programmed, main telephone transmits a signal that disables the ringers of all the other telephones connected on the same line. Thus, the only ring produced for incoming telephone calls on that line is the ring of the main telephone which has the capability of being distinctive.

Callee identification logic unit 400 identifies the callee of the incoming call by inquiring the caller. Upon receiving and answering the incoming telephone call, callee identification logic unit 400 sends a signal to identification unit 410 to begin the identification of the callee. Identification unit 410 prompts the caller to provide information on the callee, preferably by using voice recognition or the keypad.

In one embodiment, identification unit 410 prompts the caller to enter a number that corresponds to the callee of the telephone call. Identification unit 410 accesses the database in memory 420 to use information with which to prompt the caller. For example, the identification unit may transmit a message like:

"You may enter your selection at any time.
To speak with Dave, please enter '1';
to speak with Joe, please enter '2';
to speak with Adam, please enter '3';
to speak with Kim, please enter '4'."

At any time, the caller may enter the appropriate number which will identify the callee to telephone system 100. At that time, callee identification logic unit 100 generates the appropriate ring signal corresponding to the identified user. The ring signal is sent to distinctive ringer 430 which converts the electrical signal to an audible signal. The audible signal alerts the appropriate user that the incoming telephone call is intended for him/her.

Alternatively, identification unit 410 requests the caller to voice the name of the callee of the telephone call. An example conversation in this case may be:

ID unit: "Please say the name of the person that you are trying to reach."
Caller: "Adam."
ID unit: "Please wait."

Identification unit 400 performs voice recognition on the caller's reply to identify the callee. The results of the voice recognition are compared with the callee information contained in the database to more accurately determine the identity of the callee. Upon determining the identity of the callee, callee identification logic unit 400 sends the appropriate distinctive ring signal to distinctive ringer 430. The distinctive ring signal alerts the appropriate callee that the incoming call is intended for him/her. In one embodiment, if the caller does not provide input to the callee identification logic unit 400, the telephone system generates a generic ring signal.

Figure 6:
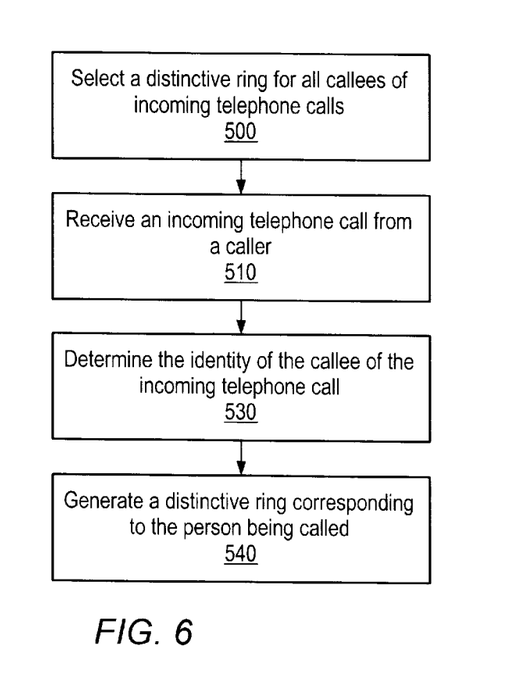
FIG. 6 shows a flowchart describing a method for identifying the callee of an incoming telephone call.

The flowchart of FIG. 6 describes a method for identifying the callee of an incoming telephone call. During setup in step 500, the users of the telephone system program the telephone by selecting a distinctive ring signal. The users select a distinctive ring signal by lifting the handset, dialing a numeric code that enters the telephone into program mode, and by choosing a ring from a menu of ring signals. The distinctive ring signal may also be selected using a computer system coupled to the telephone system, or through other means.

In step 510, a telephone call is received from a caller and the telephone system answers the telephone call. In step 530, the telephone system identifies the callee of the incoming telephone call. In one embodiment, the caller is prompted to select a callee from a voice menu, and the caller enters a code which identifies the callee. Alternatively, the caller is prompted to say the name of the name of the callee of the incoming telephone call. In that case, voice recognition is performed on the name to determine the identity of the callee. The results of the voice recognition are compared to stored voices of the names of all the users of telephone system.

After the caller is identified in step 540, a distinctive ring signal is generated corresponding to the identified callee. The distinctive ring signal provides an immediate indication of which person in the household is being called. A distinctive ring signal is useful, for example, in situations where multiple roommates in a household are sharing one telephone line. A distinctive ring signal identifies a particular callee and prevents the others from answering the phone. Similarly, such a feature would be useful in household with teenage children that receive many telephone calls. By having a distinctive ring signal, the parents could recognize calls that are intended for them and telephone calls that are intended for their children.

In an embodiment where multiple telephones are connected on the same telephone line, such as in a home, one of the telephones is designated as the master telephone. In this embodiment, at least a subset, or all, of the telephones connected on the line have circuitry according to the present invention which enables them to perform the identifying functions and generate the distinctive ring signals. Upon receiving an incoming telephone call, the telephones which include the distinctive ring circuitry answer the telephone call. In an embodiment where the caller is prompted by the answering telephone with a message, preferably only the master telephone performs the prompting, i.e., plays the voice message to the caller. The other telephones remain on standby while the outgoing message is played to the caller. Information obtained from the caller, i.e., the information identifying the callee, is processed by the respective telephones which include the present invention. In this embodiment, the telephones which include the present invention process the information obtained from the caller in order to obtain the identity of the callee. As a result, these telephones generate a distinctive ring in response to identifying the callee of the incoming telephone call. This embodiment enables multiple phones in a location, such as a home, to each generate a distinctive ring signal according to the present invention.

Third Embodiment, System for Identifying Callees of Incoming Telephone Calls by Identifying the Caller In the third embodiment, the present invention comprises an improved telephone system that identifies callees of incoming telephone calls by first identifying the caller. Such a telephone system is shown in FIG. 1. In this embodiment, switch 130 is used for enabling and disabling the caller/callee identification feature. Alternatively, the callee identification feature is activated by lifting handset 110 and entering a specific numeric code through keypad 120. Such a telephone, without switch 130, is shown in FIG. 2. As noted above, in an alternate embodiment, the user can enable/disable the caller/caller identification function using a computer system coupled to the telephone system. As used in the present invention, "telephone" may refer to a conventional or telephone, a digital telephone, cordless telephone, or a cellular telephone. Furthermore, the telephone functions may be performed by a computer, a PDA, a web surfer, or any other system that has a sub-function that acts like a classic telephone.

Figure 7:
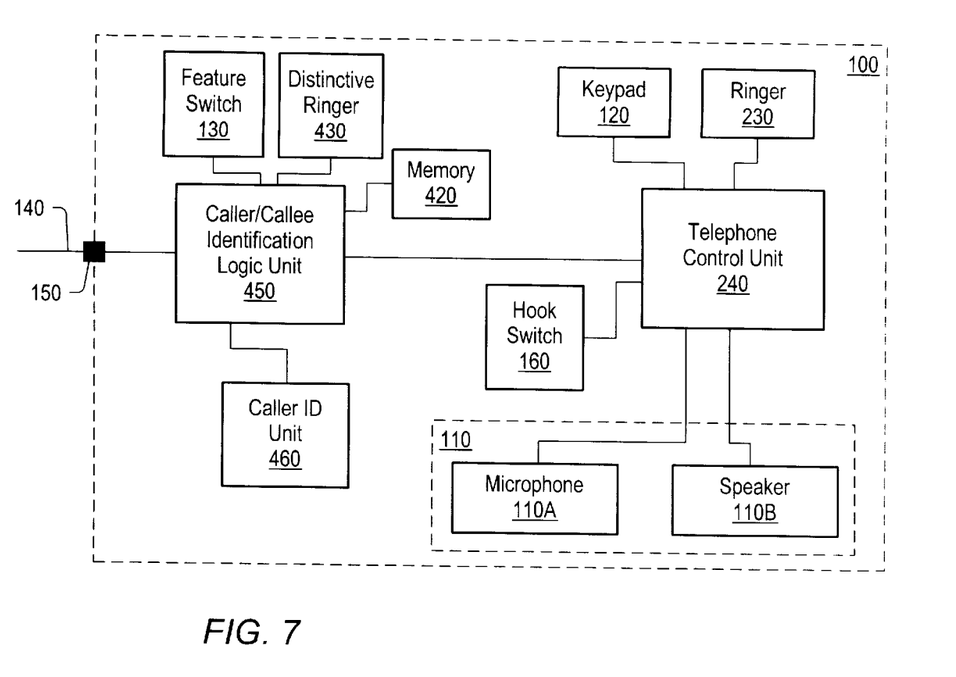
FIG. 7 shows a block diagram of a telephone that identifies the callee of an incoming telephone call by identifying the caller.

FIG. 7 shows a block diagram of telephone system 100 with the caller/callee identification feature. When a caller places a call to telephone system 100, a ring signal is transmitted to telephone system 100 through telephone line 140. Caller/callee identification logic unit 450, which is directly coupled to port 150, first receives the incoming ring signal. Caller/callee identification logic unit 450 then identifies the caller of the incoming call, preferably using caller ID. Using that information, caller/callee identification logic unit 450 then determines the identity of the callee and generates a distinctive ring that identifies the callee. A more detailed description of the caller and callee identification process will follow. After identifying the callee and generating the distinctive ring signal, caller/callee identification logic unit 450 transfers control to telephone control unit 240. The callee identified by the distinctive ring signal may now answer the phone in a normal fashion.

Prior to receiving a telephone call, one or more of the users of the telephone system programs telephone system 100 with the user's name (or code), a distinctive ring corresponding to each one of the users, and a list of possible callers corresponding to each user. The users may also reprogram the telephone system at any later time in order to add or subtract names and associated distinctive ring signals. The user enters a numeric code (for example, *37) using keypad 120 which places callee identification logic unit 700 into program mode. By following voice instructions, the user voices his/her name which is digitized by callee identification logic unit 450 and stored in memory 420 in the form of a database. By following instructions, the user also voices a list of possible callers that he/she may be receiving telephone calls from. Alternatively, the user enters his/her name and the list of possible callers into the telephone by entering special codes through keypad 120. A combination of two numbers on the keypad may correspond to one letter of the alphabet, for example. The user then continues through the voice menu in order to select a distinctive ring signal that will be generated for telephone calls intended for him/her. A code for the selected ring signal is added to the database in memory 420. The following table contains an example of what the database in memory 420 may contain.

| # | Name of Callee | Possible Callers | Ring Signal Code |
|---|---|---|---|
| 1 | Dave | Jay, Mary, & Bob | 13 |
| 2 | Joe | Chris & Peter | 9 |
| 2 | Adam | Nik, Greg, & Craig | 4 |
| 4 | Kim | Tim, Gina, & Pam | 11 |
| . | . |  | . |
| . | . |  | . |

Upon receiving and answering an incoming telephone, caller/callee identification logic unit 450 transfers control to Caller ID unit 460 performs the caller identification. Obtaining caller information using a Caller ID unit is well known in the art.

Alternatively, the identity of the caller is determined using voice recognition techniques. Upon answering the telephone, a voice recognition unit prompts the caller for his/her name. An example conversation may be:

ID unit: "Please say your name."

Caller: "Adam."

ID unit: "Please wait . . . Bob is being called. Or, no one is accepting your calls at this time."

The voiced name of the caller is then analyzed to determine his/her identity.

In one embodiment, callers are assigned personal identification numbers (PINs). Upon placing a call, the caller is asked, for example, to enter a PIN into the system. The database that is stored in memory 420 is modified to include PIN numbers in addition to names of callers.

After determining the identity of the user, caller/callee identification logic unit 450 accesses the database stored in memory 420 to search for the name of the caller. If the name of the caller is found in the database, the name of the corresponding callee is noted and a ring signal corresponding to the identified callee is generated. The ring signal is transmitted to distinctive ringer 430 that produces a distinctive ring which identifies the appropriate user. If the name of the user does not exist in the database, a generic ring signal is generated. Such a signal indicates to the users that an unknown caller is calling.

Figure 8:
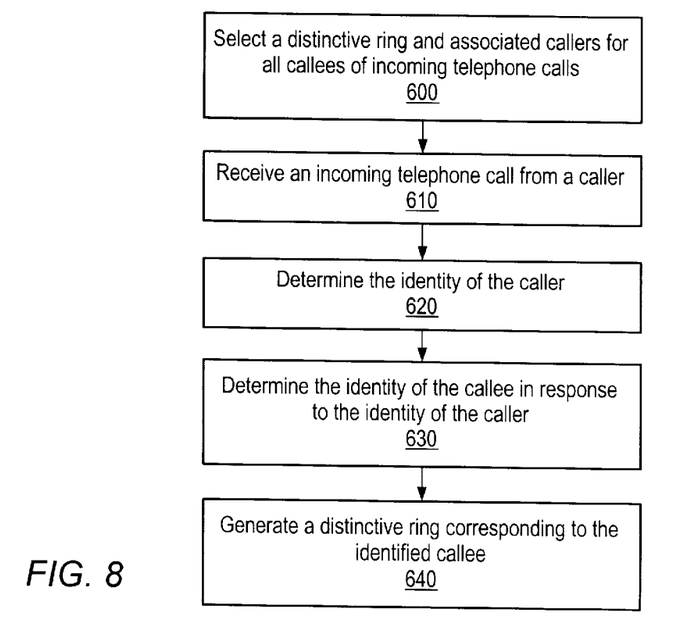
FIG. 8 shows a flowchart describing a method for identifying the callee of an incoming telephone call by identifying the caller.

The flowchart of FIG. 8 describes a method for identifying the callee of an incoming telephone call by identifying the caller. During setup in step 600, the users of the telephone system program the telephone by selecting a distinctive ring signal. The users select a distinctive ring signal by lifting the handset, dialing a numeric code that enters the telephone into program mode, and by choosing a ring from a menu of ring signals. In addition, one or more users enter a list of possible callers using the numeric keypad. Each letter of the alphabet, for example, corresponds to a combination of numbers. In step 610, a telephone call is received from a caller and the telephone system answers the telephone call. In step 620, the telephone system identifies the caller of the incoming telephone call. The telephone system uses caller ID information, voice recognition, or prompt the caller for a numeric code in order to determine the identity of the caller.

In step 630, the identity of the callee is determined according to the information obtained on the identity of the caller. Information entered by the users during setup is scanned to determine which callee corresponds to the identified caller. Once the identity of the callee is established, a distinctive ring signal corresponding to the identified callee is generated in step 640.

In an embodiment where multiple telephones are connected on the same telephone line, such as in a home, one of the telephones is designated as the master telephone. In this embodiment, at least a subset, or all, of the telephones connected on the line have circuitry according to the present invention which enables them to perform the identifying functions and generate the distinctive ring signals. Upon receiving an incoming telephone call, the telephones which include the distinctive ring circuitry answer the telephone call. In an embodiment where the caller is prompted by the answering telephone with a message, preferably only the master telephone performs the prompting, i.e., plays the voice message to the caller. The other telephones remain on standby while the outgoing message is played to the caller. Information obtained from the caller, i.e., the information identifying the caller and/or the callee, is processed by the respective telephones which include the present invention. In this embodiment, the telephones which include the present invention process the information obtained from the caller in order to obtain the identity of the caller and/or the callee. As a result, these telephones generate a distinctive ring in response to identifying the callee of the incoming telephone call. This embodiment enables multiple phones in a location, such as a home, to each generate a distinctive ring signal according to the present invention.

Fourth Embodiment, System for Identifying and Announcing the Caller and/or the Callee of an Incoming Telephone Call by Identifying the Caller In the fourth embodiment, the present invention comprises an improved telephone system that identifies and announces the caller and/or the callee of an incoming telephone call. Such a telephone system is shown in FIG. 1. In this embodiment, switch 130 is used for enabling and disabling the caller and callee identification and announcement feature. Alternatively, the caller and callee identification and announcement is activated by lifting handset 110 and entering a numeric code through keypad 120. Such a telephone, without switch 130, is shown in FIG. 2. As used in the present invention, "telephone" may refer to a conventional or telephone, a digital telephone, cordless telephone, or a cellular telephone. Furthermore, the telephone functions may be performed by a computer, a PDA, a web surfer, or any other system that has a sub-function that acts like a classic telephone.

Figure 9:
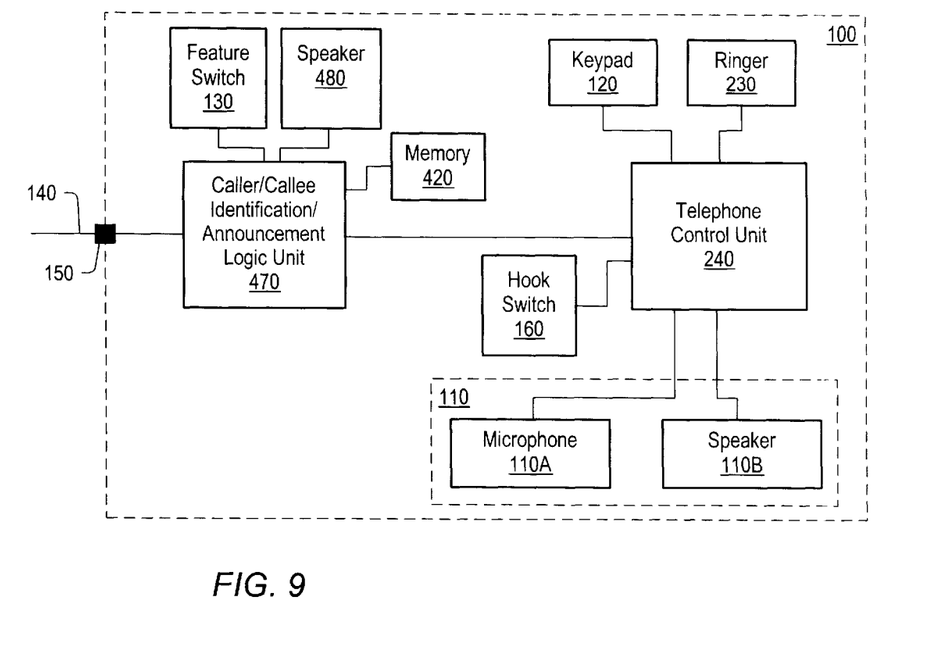
FIG. 9 shows a block diagram of a telephone system for announcing a caller and a callee of an incoming telephone call.

FIG. 9 shows a block diagram of telephone system 100 with the caller/callee identification and announcement feature. When a caller places a call to telephone system 100, a ring signal is transmitted to telephone system 100 through telephone line 140. Caller/callee identification/announcement logic unit 470, which is directly coupled to port 150, first receives the incoming ring signal. Caller/callee identification/announcement logic unit 470 first identifies the caller and the callee of the incoming call. After identifying the caller and the callee, caller/callee identification/announcement logic unit 470 announces the name of the caller and the name of the callee. A more detailed description of the caller and callee identification process will follow. After identifying the caller and the callee of the incoming telephone call and after the beginning of announcing the caller and the callee, caller/callee identification/announcement logic unit 470 transfers control to telephone control unit 240. The telephone may now be answered in a normal fashion.

The identity of the caller and the identity of the callee are determined using an outgoing message that asks the caller for his/her name and for the name of the callee. After answering the telephone, caller/callee identification/announcement logic unit 470 prompts the caller for his/her name and/or for the name of the callee. An example conversation may be:

ID unit: "Please say your name."

Caller: "Adam."

ID unit: "Please wait."

If the name of the callee is also desired, the conversation may be:

ID unit: "Please say your name first followed by a brief pause and then the name of the person that you are trying to reach"

Caller: "Adam . . . Paul"

ID unit: "Please wait."

Caller/callee identification/announcement logic unit 470 stores the two names in memory 420 and then repeatedly sends voice signals to speaker 480 up to a certain number of times. An example of what may be the output of the speaker is:

Speaker: "Adam is calling for Paul,
  Adam is calling for Paul,
  Adam is calling for Paul,
  Adam is calling for Paul,
  Adam is calling for Paul"

In this example, caller/callee identification/announcement logic unit 470 announced the incoming call five times. After that, if the callee still has not responded to the incoming call by lifting handset 110, caller/callee identification/announcement logic unit 470 either sends a final outgoing message to the caller and then hangs up the phone or reroutes the telephone call to an answering machine. An example of a final outgoing message may be:

"We are sorry, the party that you are trying to reach is not answering. Please try your call again later."

Figure 10:
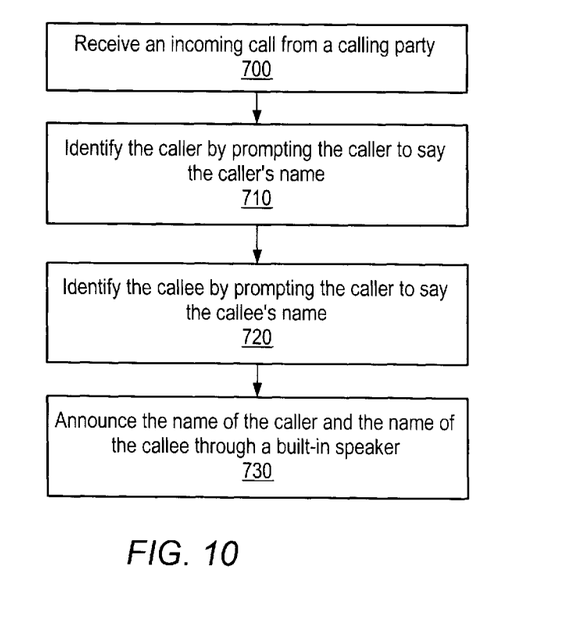
FIG. 10 shows a flowchart describing a method for announcing a caller and a callee of an incoming telephone call.

The flowchart of FIG. 10 describes a method for identifying and announcing the caller and/or the callee of an incoming telephone call. In step 700, a telephone call is received from a caller and the telephone system answers the telephone. In step 710, the telephone system identifies the caller of the incoming telephone call. The telephone system prompts the caller to say his/her name. The caller, in step 720 is asked to say the name of the person that he/she is trying to reach (callee). The telephone system stores both the name of the caller and the name of the callee in memory. In step 730, the telephone system announces the name of the caller and the name of the callee by reading the names from memory and by sending the names to a built-in speaker. Alternatively, the identity of the caller is determined by performing caller ID functions.

In an embodiment where multiple telephones are connected on the same telephone line, such as in a home, one of the telephones is designated as the master telephone. In this embodiment, at least a subset, or all, of the telephones connected on the line have circuitry according to the present invention which enables them to perform the identifying functions and announce the caller and/or the callee. Upon receiving an incoming telephone call, the telephones which include the announcing circuitry answer the telephone call. In an embodiment where the caller is prompted by the answering telephone with a message, preferably only the master telephone performs the prompting, i.e., plays the voice message to the caller. The other telephones remain on standby while the outgoing message is played to the caller. Information obtained from the caller, i.e., the information identifying the caller and/or the callee, is processed by the respective telephones which include the present invention. In this embodiment, the telephones which include the present invention process the information obtained from the caller in order to announce the caller and/or the callee. This embodiment enables multiple phones in a location, such as a home, to each announce the caller and/or the callee according to the present invention.

Fifth Embodiment, System for Self-announcing a Caller of an Incoming Telephone Call In the fifth embodiment, the present invention comprises an improved telephone system and method for self-announcing a caller of an incoming telephone call. Such a telephone system is shown in FIG. 1. In this embodiment, switch 130 is used for enabling and disabling the self-announcing feature. Alternatively, the self-announcing feature is activated by lifting handset 110 and entering a numeric code through keypad 120. Such a telephone, without switch 130, is shown in FIG. 2. As described above, the self-announcing feature may also be enabled and disabled by a computer connected to the telephone. As used in the present invention, "telephone" may refer to a conventional or telephone, a digital telephone, cordless telephone, or a cellular telephone. Furthermore, the telephone functions may be performed by a computer, a PDA, a web surfer, or any other system that has a sub-function that acts like a classic telephone.

Figure 11:
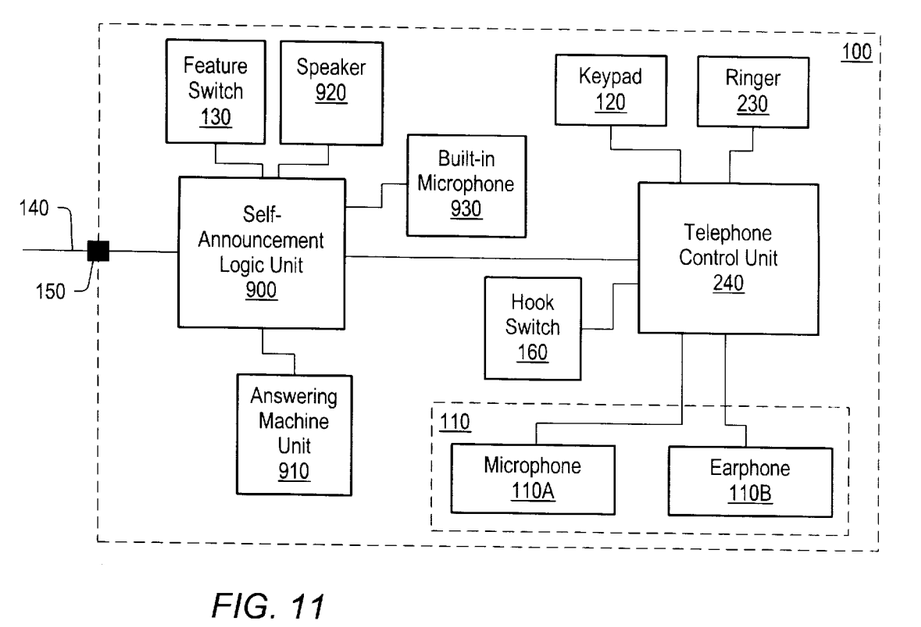
FIG. 11 shows a block diagram of a telephone system for self-announcing a caller of an incoming telephone call.

FIG. 11 shows a block diagram of telephone system 100 with the self-announcing feature. When a caller places a call to telephone system 100, a ring signal is transmitted to telephone system 100 through telephone line 140. Self-announcement logic unit 900, which is directly coupled to port 150, first receives the incoming ring signal and then answers the telephone call. In one embodiment, telephone system 100 automatically answers the incoming telephone call before the telephone or telephones are able to generate a ring signal. In another embodiment, the telephone system answers the telephone after one ring signal in order to alert the users to the incoming telephone call.

After answering the telephone call, self-announcement logic unit 900 generates a message prompting the caller to self-announce him/herself to the users of the telephone. In addition, self-announcement logic unit 900 activates speaker 920 so that the caller's announcement is audible to the users of the telephone. The volume of the speaker is preset by the users. An example of a message generated by self-announcement logic unit 900 is:

"You have reached John, Andrew, and Keith. Please announce your self by saying your name and the purpose of your telephone call after the tone."

In another embodiment, the telephone enters the announcement mode by producing a tone without first prompting the caller. This is useful when most of the regular callers to the telephone are familiar with the procedure, and the prompt from the telephone system becomes repetitive. After being prompted and/or hearing the characteristic tone, the caller is expected to announce him/herself. An example of such an announcement is:

"This is John calling to ask Peter whether he is going to the football game tomorrow."

In one embodiment, an audible tone is generated by self-announcement logic unit 900 prior to the caller's self-announcement. Such a tone alerts the users of the telephone to the incoming call and to the fact that the caller is about to announce him/herself. The short audible tone is substantially different sounding form the telephone's regular ringer.

Built-in microphone 930 when used with speaker 920 allows the telephone to be used in speakerphone mode. The speakerphone mode is activated by operating a speakerphone switch on the telephone. In speakerphone mode, the telephone user performs hands-free conversations that do not require the use of the handset.

In one embodiment, the telephone comprises a feature that allows the user to select automatic microphone activation after receiving an incoming call. When automatic microphone activation is selected, after receiving an incoming call, the telephone automatically activates built-in microphone 930 in addition to activating speaker 920 for the caller self-announcement. This enables the telephone user to begin talking in response to the caller self-announcing him/herself without any input required form the user.

For more privacy, the user may choose to not select the automatic microphone activation feature. When automatic microphone activation is not selected, after a call is received, the telephone user is able to hear the caller's self-announcement, but the caller is not able to hear the telephone user, e.g. callee. If the user is present and decides that he/she wants to answer the telephone call, the user manually activates the microphone by either pressing the speakerphone button which activates built-in microphone 930 and places the telephone in speakerphone mode or lifts the handset to engage in a conversation with the caller.

The length of time that a caller is given to stay on the line while announcing him/herself is user programmable. The user can enter this time in seconds by lifting the handset or depressing the speakerphone button, entering a code that enters the telephone in program mode, and then entering the time in seconds using keypad 120. Alternatively, the time is entered using a computer system connected to the telephone. If no one answers the telephone within the allowable amount of time, self-announcement logic unit 900 transfers control to answering machine unit 910. The caller can then leave a message or hang up.

In another embodiment, after the allowable time has passed, the telephone generates a message requesting the caller to enter a numeric code in order to access answering machine unit 910. Answering machine unit 910 may be part of telephone 100 or answering machine unit 910 may be a separate unit external to telephone 100.

In yet another embodiment, the telephone does not enter the self-announcing mode for all callers. A database is maintained by the user or users of the telephone that contains a list of users for which the self-announcing feature is activated. For users that are not included in the database, the telephone generates a generic ring signal and does not enter into the self-announcing mode. A caller ID unit is used to determine the identity of the caller which is then compared to the names stored in the database. Such a feature would be useful in cases where the telephone user or users only wanted the self-announcing feature activated only for close relatives and friends.

In another embodiment, the database contains a list of parties for which the self-announcing feature is not activated. For example, the list may contain names of telemarketers for which the self-announcement feature is not activated.

Figure 12:
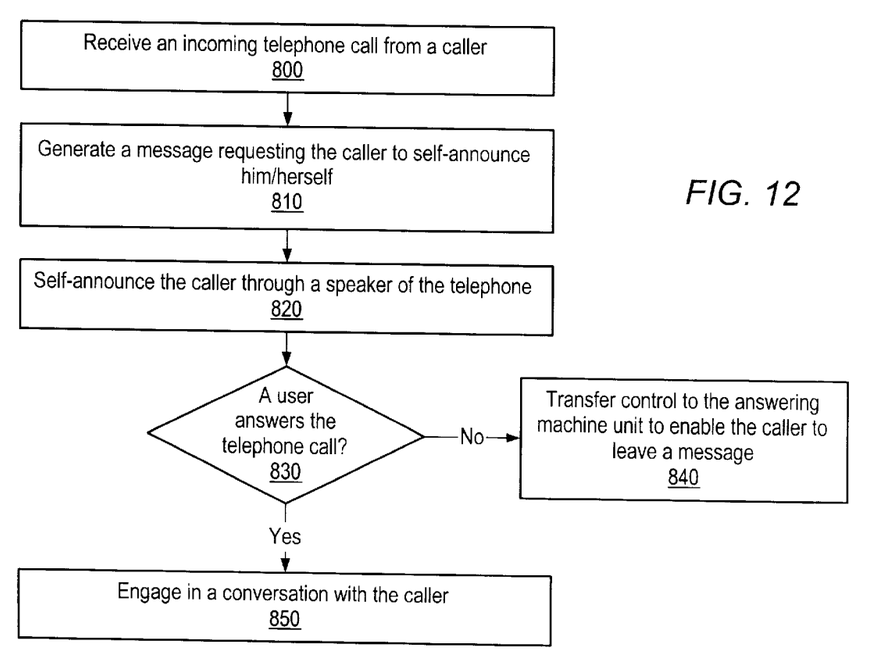
FIG. 12 shows a flowchart describing a method for self-announcing a caller of an incoming telephone call.

The flowchart of FIG. 12 describes a method for self-announcing a caller of an incoming telephone call. In step 800, an incoming call is received from a caller. The telephone system, in step 810, answers the telephone call, generates a message requesting the caller to self-announce him/herself, and activates a speaker on the telephone to enable the telephone users to listen to the announcement. When the self-announcing feature is activated, no ring signals are produced by the telephone. In step 820, the caller self-announces him/herself through the telephone's speaker.

After the caller self-announces him/herself, a user, if present, may decide to answer the telephone call. The user may answer the telephone call either by putting the telephone in speakerphone mode or by activating the handset and engaging in a conversation with the caller. If the user is not present or chooses not answer the telephone call, the telephone, in step 840, transfers control to an answering machine unit so that the caller is given the choice of leaving a message. In one embodiment, the answering machine is built-in to the telephone. In another embodiment, the answering machine is an external unit coupled to the telephone.

In an embodiment where multiple telephones are connected on the same telephone line, such as in a home, one of the telephones is designated as the master telephone. In this embodiment, at least a subset, or all, of the telephones connected on the line have circuitry according to the present invention which enables them to perform the self-announcing functions. Upon receiving an incoming telephone call, the telephones which include the self-announcing circuitry answer the telephone call. In an embodiment where the caller is prompted by the answering telephone with a message, preferably only the master telephone performs the prompting, i.e., plays the voice message to the caller. The other telephones remain on standby while the outgoing message is played to the caller. Information obtained from the caller, i.e., the information identifying the caller and/or the callee, is processed by the respective telephones which include the present invention. In this embodiment, the telephones which include the present invention process the information obtained from the caller in order to self-announce the caller. This embodiment enables multiple phones in a location, such as a home, to each self-announce the caller according to the present invention.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for announcing a caller and a callee of an incoming telephone call, the method comprising:

a telephone receiving an incoming call from the caller when the telephone is on-hook;

the telephone receiving information identifying the caller of the incoming telephone call;

receiving information identifying the callee of the incoming telephone call; and the telephone repeatedly audibly announcing the identity of the caller and the callee in response to said receiving information identifying the caller and said receiving information identifying the callee of the incoming telephone call;

wherein said receiving information identifying the caller of the incoming telephone call comprises:

the telephone generating a message requesting the caller to identify the caller of the incoming telephone call;

the telephone receiving voice information from the caller identifying the caller of the incoming telephone call;

the telephone recording said voice information from the caller;

wherein said audibly announcing comprises playing said recorded voice information.

2. The method of claim 1, wherein said receiving information identifying a callee of the incoming telephone call comprises:

generating a message asking the caller to identify said callee of the incoming telephone call;

receiving voice information from the caller identifying the callee of the incoming telephone call; and recording said voice information from the caller identifying the callee.

3. The method as recited in claim 2, wherein said repeatedly audibly announcing the identity of said callee comprises playing said recorded voice information identifying the callee.

4. A method for announcing a callee of an incoming telephone call, the method comprising:

a single telephone device receiving an incoming call from an external party;

the single telephone device inquiring the caller for the identity of the callee of the incoming call;

the single telephone device receiving information identifying the callee of the incoming telephone call; and the single telephone device repeatedly audibly announcing the callee in response to said receiving information identifying the callee of the incoming telephone call.

5. The method of claim 4, wherein said inquiring the caller for the identity of the callee of the incoming call comprises:

generating a message asking a caller to identify the callee of the incoming telephone call after said receiving the incoming telephone call;

and wherein said receiving information identifying the callee of the incoming telephone call comprises:

receiving voice information from said caller identifying the callee of the incoming telephone call; and recording said voice information from the caller.

6. The method of claim 5, wherein said repeatedly audibly announcing comprises playing said recorded voice information.

7. The method of claim 4, further comprising:

receiving information identifying a caller of the incoming telephone call; and audibly announcing said caller in response to said receiving information identifying said caller of the incoming telephone call.

8. The method of claim 7, wherein said receiving information identifying the caller of the incoming telephone call comprises: generating a message asking said caller to identify said caller of the incoming telephone call after said receiving the incoming telephone call;

receiving voice information from said caller identifying said caller of the incoming telephone call; and recording said voice information from said caller.

9. The method of claim 8, wherein said audibly announcing said caller comprises playing said recorded voice information.

10. The method of claim 7, wherein said receiving information identifying said caller of the incoming telephone call comprises receiving Caller ID information which identifies said caller of the incoming telephone call.

11. The method as recited in claim 4, wherein said repeatedly audibly announcing the callee is performed a predetermined number of times.

12. The method as recited in claim 11, further comprising, after said repeatedly audibly announcing the callee a predetermined number of times, allowing the caller to leave a message.

13. The method as recited in claim 11, further comprising, after said repeatedly audibly announcing the callee a predetermined number of times, sending a final outgoing message to the caller and hanging up.

14. A telephone which identifies and announces a callee of an incoming telephone call, the telephone comprising:

a port for coupling to a telephone line for receiving a telephone signal;

an identification logic unit coupled to the port, wherein the identification logic unit determines the identity of the callee of the incoming telephone call by inquiring the caller for the identity of the callee; and a speaker coupled to the identification logic unit, wherein the speaker repeatedly announces the identity of the callee;

wherein said port, said identification logic unit, and said speaker are comprised within a single telephone device.

15. A telephone system which identifies and announces a callee of an incoming telephone call, the telephone system comprising:

a master telephone comprising:

a port for coupling to a telephone line for receiving a telephone signal;

an identification logic unit coupled to the port, wherein the identification logic unit determines the identity of the callee of the incoming telephone call by inquiring the caller for the identity of the callee;

a speaker coupled to the identification logic unit, wherein the speaker announces the identity of the callee;

one or more slave telephones comprising:

a slave port for coupling to the telephone line for receiving the telephone signal;

a slave identification logic unit coupled to the slave port, wherein the slave identification logic unit determines the identity of the callee of the incoming telephone call;

a slave speaker coupled to the salve identification logic unit, wherein the slave speaker announces the identity of the callee.

16. A telephone system which identifies and announces a caller of an incoming telephone call, the telephone system comprising:

a master telephone comprising:

a port for coupling to a telephone line for receiving a telephone signal;

an identification logic unit coupled to the port, wherein the identification logic unit determines the identity of the caller of the incoming telephone call; and a speaker coupled to the identification logic unit, wherein the speaker announces the identity of the caller; and one or more slave telephones comprising:

a slave port for coupling to the telephone line for receiving the telephone signal;

a slave identification logic unit coupled to the slave port, wherein the slave identification logic unit determines the identity of the caller of the incoming telephone call; and a slave speaker coupled to the slave identification logic unit, wherein the slave speaker announces the identity of the caller.

17. The telephone of claim 16, further comprising a caller ID unit for determining the identity of the caller of the incoming telephone call.

18. The telephone of claim 16, further comprising a slave caller ID unit for determining the identity of the caller of the incoming telephone call.

19. A telephone which identifies and announces a callee and a caller of an incoming telephone call, the telephone comprising:

a port for coupling to a telephone line for receiving a telephone signal;

an identification logic unit coupled to the port, wherein the identification logic unit determines the identity of the caller and the callee of the incoming telephone call by inquiring the caller for the identity of the caller and the callee; and a speaker coupled to the identification logic unit, wherein said speaker repeatedly announces the identity of the callee and the caller.

20. The telephone of claim 19, further comprising a caller ID unit for determining the identity of the caller of the incoming telephone call.

21. A telephone system which identifies and announces a caller and a callee of an incoming telephone call, the telephone system comprising:

a master telephone comprising:

a port for coupling to a telephone line for receiving a telephone signal;

an identification logic unit coupled to the port, wherein the identification logic unit determines the identity of the caller and the callee of the incoming telephone call by inquiring the caller for the identity of the caller and the callee; and a speaker coupled to the identification logic unit, wherein said speaker announces the identity of the callee and the caller; and one or more slave telephones comprising:

a slave port for coupling to the telephone line for receiving the telephone signal;

a slave identification logic unit coupled to the slave port, wherein the slave identification logic unit determines the identity of the caller and the callee of the incoming telephone call; and a slave speaker coupled to the slave identification logic unit, wherein said slave speaker announces the identity of the callee and the caller.

22. The telephone of claim 21, further comprising a slave caller ID unit for determining the identity of the caller of the incoming telephone call.

23. A method for announcing a caller and a callee of an incoming telephone call, the method comprising:

receiving an incoming call from the caller when the telephone is on-hook;

receiving information identifying the caller of the incoming telephone call;

receiving information identifying the callee of the incoming telephone call; and repeatedly audibly announcing the identity of the caller and the callee in response to said receiving information identifying the caller and said receiving information identifying the callee of the incoming telephone call.

24. The method as recited in claim 23, wherein said receiving information identifying the caller of the incoming telephone call comprises:

generating a message requesting the caller to identify the caller of the incoming telephone call;

receiving voice information from the caller identifying the caller of the incoming telephone call;

recording said voice information from the caller;

wherein said repeatedly audibly announcing comprises playing said recorded voice information.

25. The method as recited in claim 23, wherein said receiving information identifying the caller of the incoming telephone call comprises receiving caller ID information identifying the caller.

26. The method as recited in claim 23, wherein said receiving information identifying the callee of the incoming telephone call comprises:

generating a message requesting the caller to identify the callee of the incoming telephone call;

receiving voice information from the caller identifying the callee of the incoming telephone call;

recording said voice information from the caller;

wherein said repeatedly audibly announcing comprises playing said recorded voice information.

27. The method as recited in claim 23, wherein said repeatedly audibly announcing the identity of the caller and the callee is performed a predetermined number of times.

28. The method as recited in claim 27, further comprising, after said repeatedly audibly announcing the identity of the caller and the callee a predetermined number of times, allowing the caller to leave a message.

29. The method as recited in claim 27, further comprising, after said repeatedly audibly announcing the identity of the caller and the callee a predetermined number of times, sending a final outgoing message to the caller and hanging up.

* * * * *

UNITED STATES PATENT AND TRADEMARK OFFICE
CERTIFICATE OF CORRECTION

PATENT NO. : 6,385,303 B1
DATED : May 7, 2002
INVENTOR(S) : Peterson et al.

It is certified that error appears in the above-identified patent and that said Letters Patent is hereby corrected as shown below:

Column 19,
Line 59, please delete "salve" and insert -- slave -- in place thereof.

Signed and Sealed this

Second Day of July, 2002

Attest:

Attesting Officer

JAMES E. ROGAN
Director of the United States Patent and Trademark Office